(12) United States Patent
Kaneko et al.

(10) Patent No.: US 6,502,372 B1
(45) Date of Patent: Jan. 7, 2003

(54) APPARATUS FOR SEALING PACKAGING CONTAINERS

(75) Inventors: Masamichi Kaneko, Tokyo (JP); Magnus Rabe, Lund (SE)

(73) Assignee: Tetra Laval Holdings & Finance, SA, Pully (CH)

( * ) Notice: Subject to any disclaimer, the term of this patent is extended or adjusted under 35 U.S.C. 154(b) by 0 days.

(21) Appl. No.: 09/623,096

(22) PCT Filed: Feb. 26, 1999

(86) PCT No.: PCT/US99/04305

§ 371 (c)(1),
(2), (4) Date: Nov. 14, 2000

(87) PCT Pub. No.: WO99/43557

PCT Pub. Date: Sep. 2, 1999

(30) Foreign Application Priority Data

Feb. 26, 1998 (JP) .............................................. 10-45557

(51) Int. Cl.[7] .................................................. B65B 7/00
(52) U.S. Cl. ........................ 53/476; 53/371.2; 53/374.2; 53/DIG. 2
(58) Field of Search .......................... 53/371.2, DIG. 2, 53/565, 374.2, 476; 156/580.1, 580.2

(56) References Cited

U.S. PATENT DOCUMENTS

| | | | |
|---|---|---|---|
| 3,866,812 A | * | 2/1975 | Gutjahr |
| 3,874,976 A | * | 4/1975 | MacFarland, Jr. |
| 4,080,241 A | * | 3/1978 | Grevich et al. |
| 4,244,773 A | * | 1/1981 | Siebeck et al. |
| 4,866,914 A | * | 9/1989 | Moribe |
| 5,457,937 A | * | 10/1995 | Wald |
| 5,564,255 A | * | 10/1996 | Giacomelli |
| 5,605,026 A | * | 2/1997 | Schott et al. |
| 5,713,181 A | * | 2/1998 | Giacomelli |
| 5,714,033 A | * | 2/1998 | Hayashi et al. |
| 5,775,055 A | * | 7/1998 | Giacomelli et al. |

* cited by examiner

Primary Examiner—Eugene Kim
(74) Attorney, Agent, or Firm—Welsh & Katz, Ltd.

(57) ABSTRACT

An apparatus and method for sealing a sealing area of a packaging container in which the sealing area has a predetermined exterior shape. The apparatus includes a generator, a horn and an anvil. The anvil has an abutting portion that conforms to the exterior shape of the sealing area of the packaging container. The plurality of slidable plates may be composed of a ferromagnetic material, a paramagnetic material or a ceramic material. The plurality of slidable plates are supported on an elastic sleeve that allows for the inward movement of the plates when the force exerted by the horn on the sealing area exceeds the elastic force of the sleeve thereby allowing the corresponding plurality of slidable plates to conform to the exterior shape of the sealing area of the packaging container. An electromagnet may be used to restrict the movement of the slidable plates subsequent to their conforming to the exterior shape of the sealing area.

25 Claims, 6 Drawing Sheets

APPARATUS FOR SEALING PACKAGING CONTAINERS

TECHNICAL FIELD

The present invention relates to an apparatus for sealing packaging containers. More specifically, the present invention relates to an ultrasonic sealing apparatus for sealing packaging containers.

BACKGROUND ART

Packaging containers for holding liquid food such as milk, fresh beverages, and the like have been conventionally manufactured by processing packaging materials into specified container shapes. In the case of gable top cartons, such as the TETRA REX® carton, a carton blank cut to a specified shape and size, and longitudinally sealed together is typically manufactured on a packaging machine by erecting the blank into a cylindrical sleeve. The erected carton blank is then placed onto a mandrel for bottom forming and sealing. The partially formed carton is then placed on a conveyor for transport to additional processing stations on the packaging machine. A fitment may be attached at a processing station and the partially-formed carton may be sterilized at another processing station. The partially-formed carton is then filled with a desired liquid food product at a filling station. The filled carton is then transported to a top sealing station where the top panels of the carton are folded along specified creases and sealed together to form the finished formed, filled and sealed gable top carton.

In the case of a parallelepiped container such as the TETRA BRIK® package, a web of material is installed onto a vertical form, fill and seal machine. The web of material is longitudinally sealed to form a tube about a fill pipe on the machine. A transversal seal is made to the tube which is then filled with a desired liquid food product. A second transversal seal is made which also cuts the package from the entirety of the tube of material. The filled package is then folded and shaped to produce the ubiquitous TETRA BRIK® package.

For the above-mentioned packages, and other packages, the packaging material is usually composed of paperboard base material with both sides coated with a thermoplastic resin material such as polyethylene. Additionally, the paperboard base material may have a gas barrier layer which may also be coated with a thermoplastic resin material.

Several methods may be used to seal the packaging container on a packaging machine such as impulse sealing, hot air sealing and high frequency sealing. However, there are problems associated with the use of each of these methods.

The impulse sealing method has heat conducted through the paperboard base material. However, the thermal conductivity of the paperboard base material will vary with its water content. Therefore, the sealing parameters on the impulse sealing device must be adjusted with each different lot of paperboard base material and the storage conditions of the material. Such adjustments complicate the processing work and make it difficult to fabricate packaging containers in an orderly manner.

The hot air sealing method has hot air directed at specified locations of the thermoplastic resin material. The thermoplastic resin material is heated indirectly with hot air, making it impossible to control the temperature of the thermoplastic resin. Such a lack of temperature control results inconsistent seals on the packaging containers.

The high frequency sealing method requires the use of an aluminum layer as the gas barrier layer since the heat necessary to effectuate the seal is generated by high frequency waves transmitted to the aluminum layer. The necessity of the aluminum layer increases the cost of the packaging material.

Another sealing method is the use of ultrasonic energy which generates heat in the thermoplastic resin material through transmission of vibrations from an ultrasonic horn to the packaging material. The use of ultrasonic sealing negates the problem of varying water content in the paperboard base material since the thermoplastic resin is melted without regard to the thermal conductivity of the paperboard base material. This allows for a standardization of the sealing parameters on the packaging machine since adjustments for varying lots of paperboard base material and storage conditions are unnecessary. Further, the seals on the packaging containers are consistent since the thermoplastic resin material is directly heated, allowing for accurate control of the temperature. Finally, the need for an aluminum layer is negated since the seals are better (tighter, more reliable) thereby lowering the cost of the packaging material.

However, ultrasonic sealing is not without its own problems in the sealing of packaging containers. Ultrasonic sealing requires that the horn component be pressed uniformly against the sealing portions of the packaging material. When the packaging container is fabricated on the packaging machine, some sealing portions are formed with a single sealing line while other sealing portions are formed with overlapped sealing lines that cross over each other. A greater number of packaging material layers results in an increase in the overlapped portions, with a smaller number of single sealing line portions where there is no crossing over. Accordingly, the sealing pressure in the portion without the overlapping is a smaller force than in the overlapping sealing portions. This results in poor transmission of ultrasonic energy from the horn to the sealing portion of the packaging container, which results in insufficient heat generation, which results in poor or incomplete sealing of the sealing portions of the packaging container.

DISCLOSURE OF THE INVENTION

It is a primary object of the present invention to provide a novel apparatus and method to seal packaging containers with ultrasonic energy.

It is an additional object of the present invention to provide an apparatus and method for sealing packaging containers with uneven sealing portions.

It is an additional object of the present invention to provide an improved anvil for ultrasonic sealing.

One solution for the problems of the prior and the above-mentioned objectives is an apparatus for sealing packaging containers that includes an ultrasonic generator, a horn and an anvil with an abutting portion that deforms to correspond to the exterior shape of the sealing portion of the packaging container. The abutting portion may include a plurality of mutually slidable plates. Further, the apparatus may include an electromagnet for selectively restricting the sliding of each of the plates. Still further, each of the sliding plates may be composed of either a ferromagnetic material, paramagnetic material, ceramic material or any combination thereof.

Another solution is a method for sealing the sealing portions of a packaging container through using the aforementioned apparatus. In such a method, the plates are allowed to conform to the exterior shape of the sealing portion before the electromagnet is magnetized thereby restricting the movement of the slidable plates.

Yet another solution is an anvil for ultrasonic sealing that has an abutting portion that conforms to the exterior shape of the sealing portion of a container. The anvil may be composed of three blocks, with the abutting portion disposed on the middle block and an electromagnet disposed on either of the side blocks.

BRIEF DESCRIPTION OF THE DRAWINGS

There is illustrated in FIG. 1 the apparatus of the present invention for sealing packaging containers.

There is illustrated in FIG. 2 a side view of the apparatus of FIG. 1.

Figure 1:
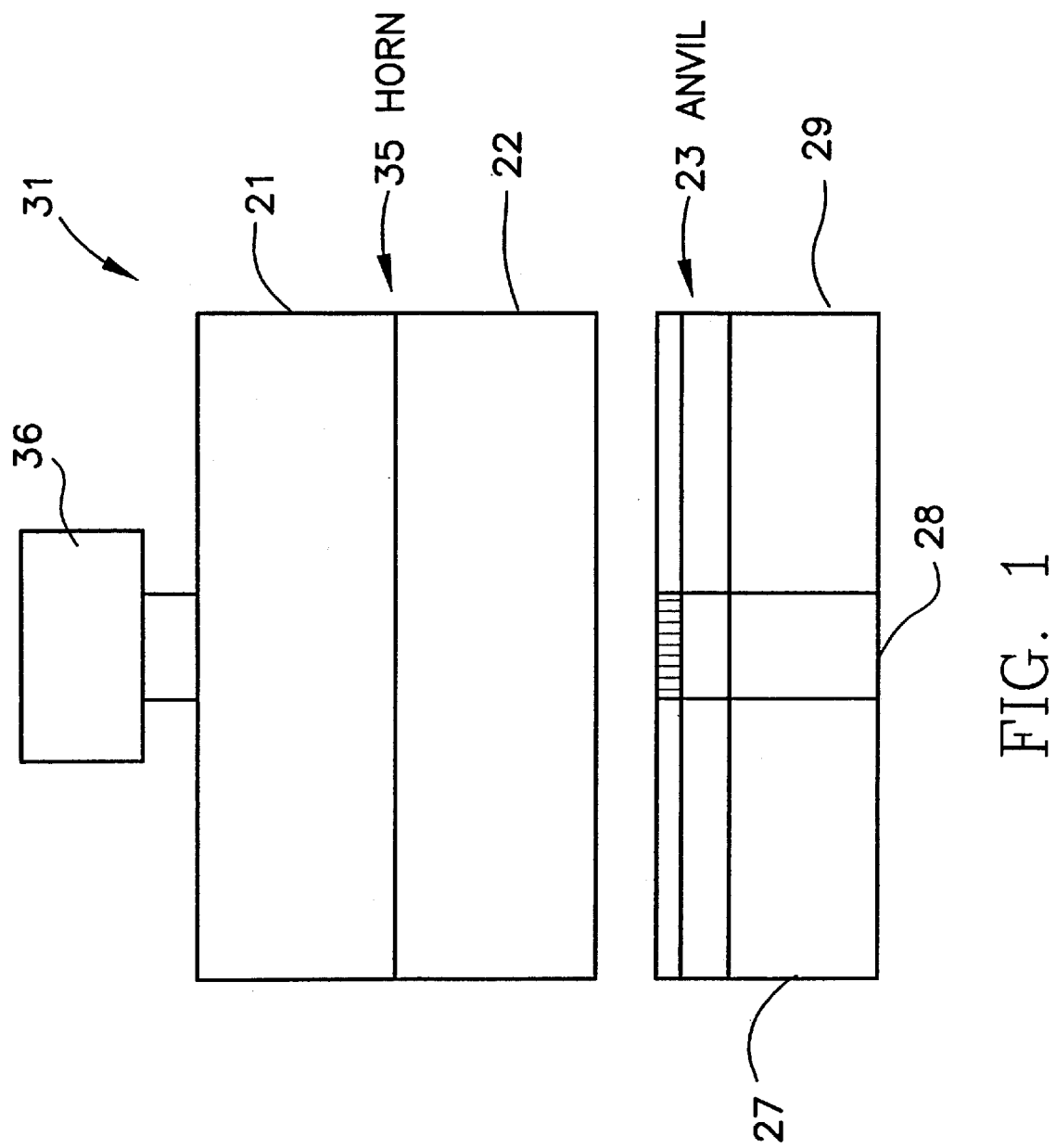
Figure 3:
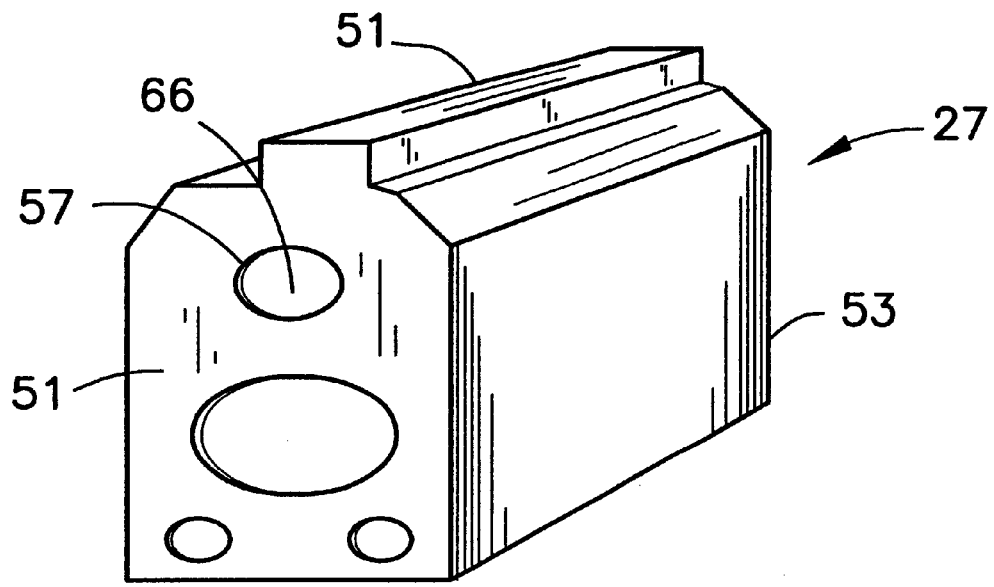

There is illustrated in FIG. 3 a perspective view of the first block of the anvil of the apparatus of FIG. 1.

Figure 4:
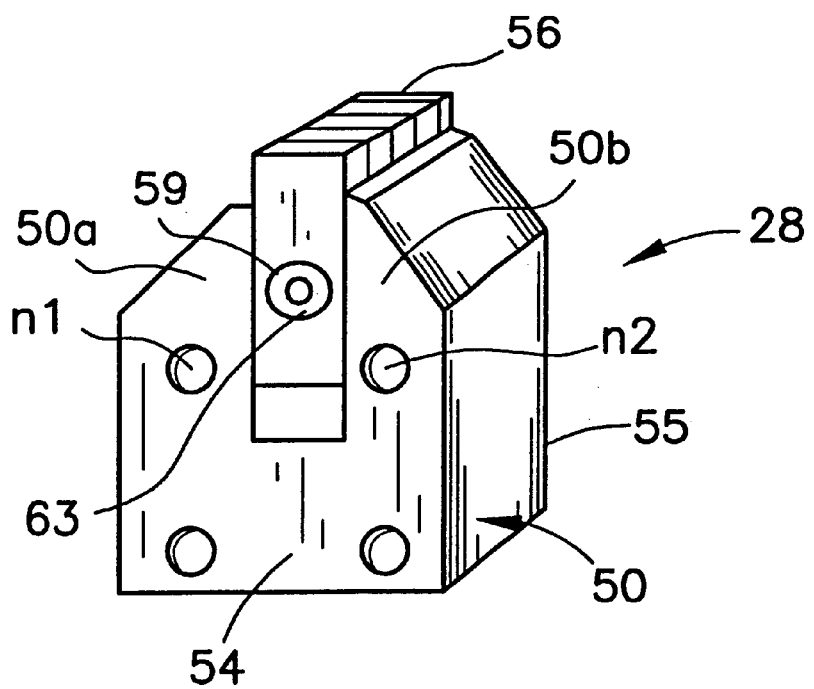

There is illustrated in FIG. 4 a perspective view of the second block of the anvil of the apparatus of FIG. 1.

Figure 5:
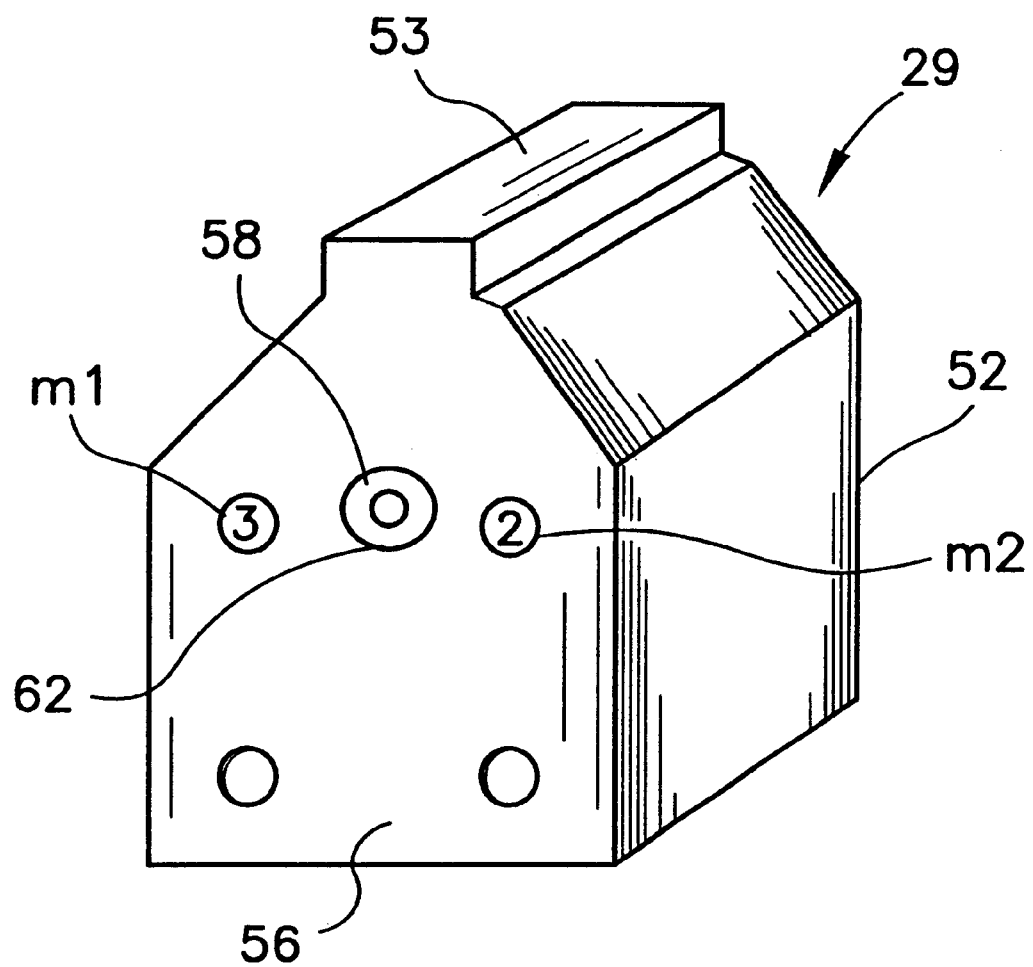

There is illustrated in FIG. 5 a perspective view of the third block of the anvil of the apparatus of FIG. 1.

Figure 6:
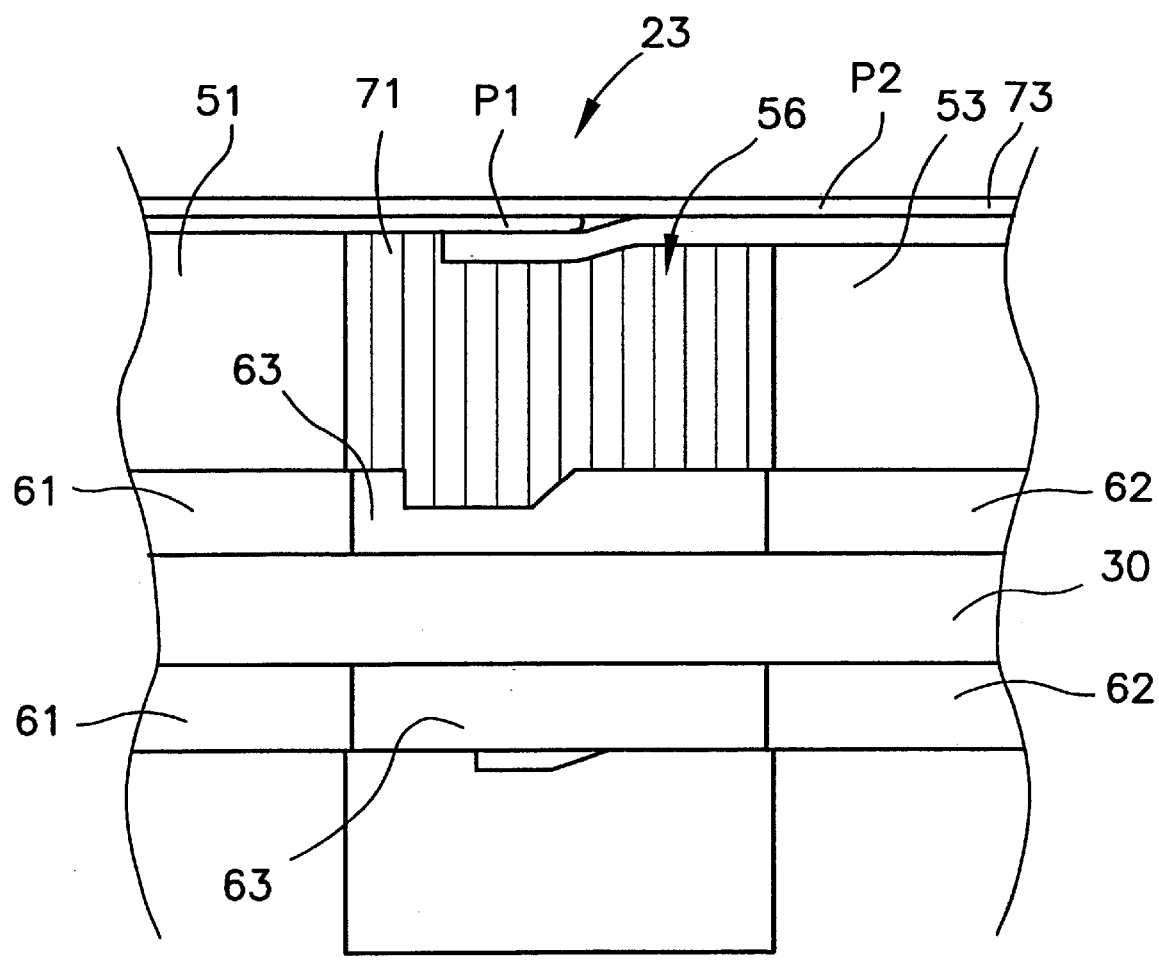

There is illustrated in FIG. 6 the anvil of the apparatus of FIG. 1 during a sealing operation.

Figure 7:
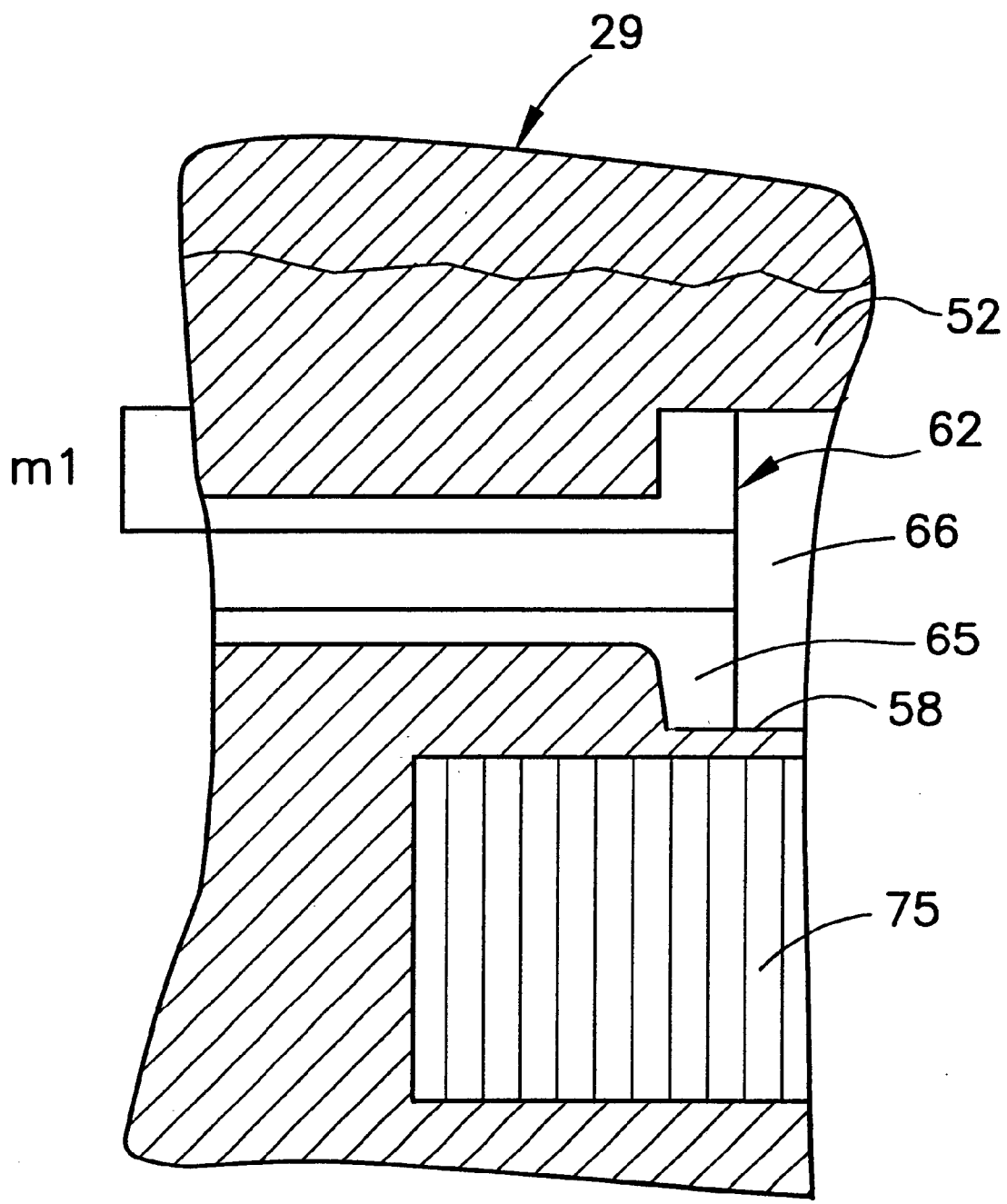

There is illustrated in FIG. 7 a cross-sectional view of the third block of FIG. 5.

BEST MODE(S) FOR CARRYING OUT THE INVENTION

Figure 2:
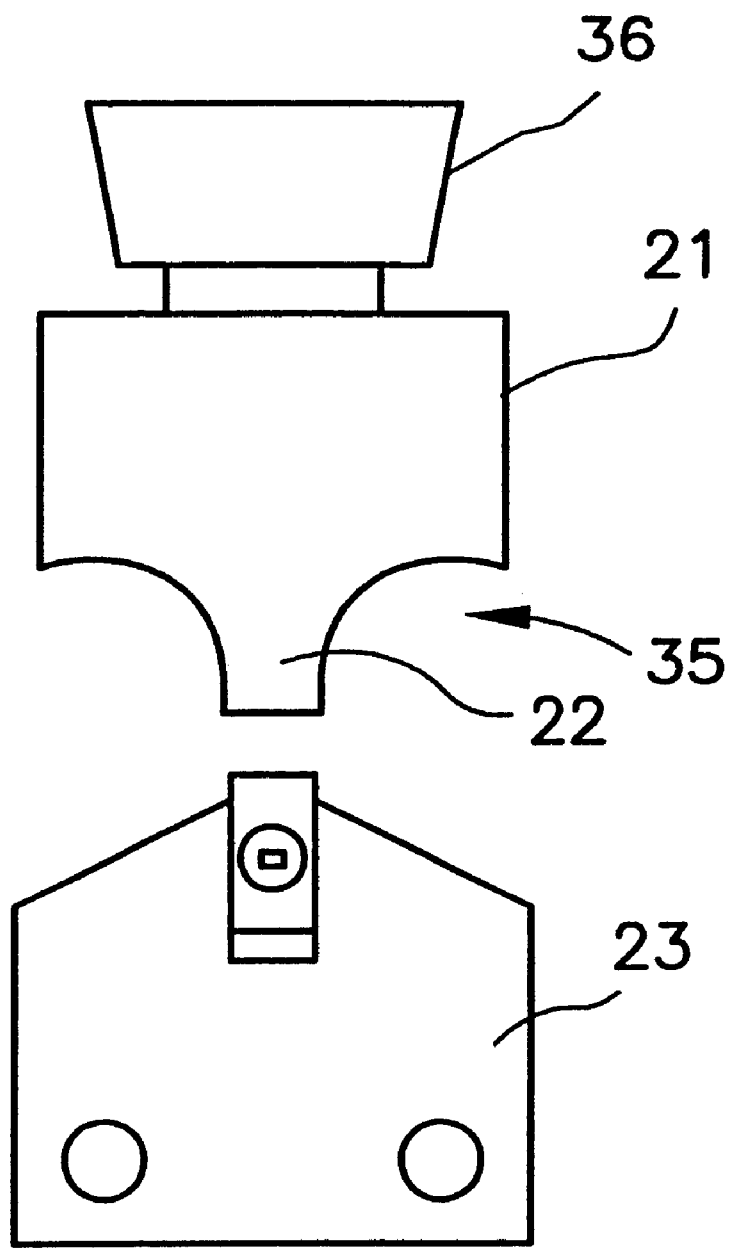

The sealing apparatus of the present invention is generally shown in FIGS. 1 and 2. The sealing apparatus is generally designated 31 and is typically attached to a packaging machine, not shown, by a bracket, not shown. The sealing apparatus 31 is usually positioned at a top sealing station which is immediately subsequent to a filling station on a linear form, fill and seal packaging machine such as a TETRA REX® packaging machine available from Tetra Pak. Alternatively, the sealing apparatus 31 may be utilized as a transversal sealer on a vertical form, fill and seal packaging machine such as the TETRA BRIK® Aseptic packaging machine also available from Tetra Pak. The sealing apparatus 31 may be oscillated through use of an air cylinder, not shown.

In general, the ultrasonic sealing apparatus 31 includes a horn 35, a driving section 36 and an anvil 23. The driving section 36 includes a vibrator and a booster, both of which are not shown. Ultrasonic energy, or vibrations, is/are generated within the vibrator and amplified by the booster before being transmitted to the horn 35. The horn 35 includes an edged cylindrical portion 21 which is coupled to the driving section 36, and a convergence section 22 formed integrally with the edged cylindrical portion 21. The converging section 22 is formed to be flatter towards its distal end, the end nearest the anvil 23. This allows for the ultrasonic energy transmitted to the horn 35 to be concentrated in the convergence section 22 and transmitted to its distal end.

The anvil 23 is disposed to oppose the horn 35, and specifically to oppose the distal end. The function of the anvil is to insulate the packaging machine from the ultrasonic energy and to support the packaging material undergoing ultrasonic sealing. The operation of the ultrasonic sealing apparatus 31, including the horn 35 and anvil 23 will be described below. As shown in FIG. 1, the anvil 23 of the present invention is composed of three blocks, a first block 27, a second block 28 and a third block 29. The side blocks 27 and 29 may be equal and create a symmetry about the center block 28. The three blocks 27, 28 and 29 are coupled to each other by coupling rods 30, shown in FIG. 6.

FIGS. 3, 4 and 5 are perspective views of the first block 27, the second block 28, and the third block 29 respectively. The first block and the third block each have abutting portions 51 and 53, respectively, that correspond to the distal end of the convergence portion 22, as best shown in FIG. 2. The second block 28 is thinner than the first block 27 and the third block 29, and the second block 28 has an abutting portion 56. The second block 28 has a main body 50 that has a U-shaped cross section with arms 50a and 50b. The abutting portion 56 is disposed between the arms 50a and 50b, and the abutting portion is capable of conforming to the exterior shape of the packaging container to be sealed on the apparatus 31.

The abutting portions 51, 53 and 56 each have holes 57–59 therethrough, and the holes 57 and 58 of abutting portions 51 and 53 are aligned with the hole 59 of abutting portion 56. A first sleeve 61 is fitted into the hole 57, and a second sleeve 62 is fitted into the hole 58. The sleeves 61 and 62 are composed of an insulating material. A sleeve 63 is fitted into the hole 59 of the abutting portion 56. The sleeve 63 is elastic and also composed of an insulating material. A plurality of coupling rods 30 are placed through the holes 61–63. The blocks 27–29 are coupled together by tightening of the coupling rods 30. Each of the sleeve 61 and 62 have a flange 65 at one end. Each of the surfaces S1 and S2 have recesses 66 for the flanges 65. A head portion and a nut, not shown disposed at either end of the coupling rod 30 are accommodated in each of the flanges 65. Further, to maintain the proper positioning of the blocks 27–29 relative to each other, a surface S3 of the first bock 27 and a surface S6 of the third block 29 each have positioning projections m1 and m2. A surface S4 and a surface S5 of the main body 50 of the second block 28 each have positioning recesses n1 and n2. The surface S3 of the first block 27 is aligned with the surface S4 of the second block 28, the surface S6 of the third block 29 is aligned with the surface S5 of the second block 28. This alignment of the surfaces S3, S4, S5, and S6 results in positioning projection m1 opposing positioning recess n1, and positioning projection m2 opposing positioning recess n2. The positioning projections m1 and m2 rest in the recesses n1 and n2.

The abutting portion 56 includes a plurality of slidable plates 71 capable of sliding freely relative to each other, and the abutting portion may be made by laminating the plurality of slidable plates 71 to each other. Each of the plurality of slidable plates 71 may be composed of a ferromagnetic material, a paramagnetic material, a ceramic material or another electrical conducting material. The bottom of each of the plurality of slidable plates 71 do not contact the main body 50 since each of the plurality of slidable plates 71 are supported by the coupling rod 30 which is disposed within the hole 59. However, if the top surface of the abutting portion 56 is pressed with a force greater than the repulsive force of the elastic sleeve 63 disposed in the hole 59, then each of the plurality of slidable plates 71 will move downward independently. The surfaces of each of the plurality of slidable plates 71 may be coated with a material that has a small coefficient of friction such as a fluorine resin, in order to facilitate the slidability of each of the plurality of slidable plates 71 relative to each other. Alternatively, instead of coating the surfaces of each of the plurality of slidable plates 71, a plurality of films composed of the material with a small coefficient of friction may be interposed between each of the plurality of slidable plates 71.

Referring to FIG. 6, a packaging material 73 is shown engaged with the anvil 23, and prepared for sealing of its sealing portions. As illustrated, the packaging material 73 has several layers overlapping in the area of P1, where the sealing lines cross each other. Specifically, three layers overlap each other in the P1 sealing area, and two layers overlap each other in the area designated P2 where the sealing lines do not cross each other. Due to this overlapping, the exterior shape of the sealing portion of the packaging material 73 is not flat, and is uneven for sealing purposes. The predetermined exterior shape of the sealing portion is primarily dependent on the number of layers, and the thickness of those layers. The abutting portion 56 will conform to this predetermined exterior shape by movement of individual plates 71. This movement of individual plates 71 occurs when the top surface of each individual plate 71 is pressed with a force greater than the repulsive force caused by the elasticity of the sleeve 63 disposed in the hole 59. Only those slidable plates 71 that engage the crossing over area P1 are moved downward/inward relative to the entirety of the slidable plates 71 and the other abutting portions 51 and 53. The ability of the abutting portion 56, and more specifically the individual plates 71, to conform to the exterior shape of the packaging material 73 allows for equal amounts of sealing pressure to be applied to both areas P1 and P2 thereby allowing for the ultrasonic energy to be sufficiently transmitted from the horn 35 to the sealing portions, areas P1 and P2, of the packaging material 73. The transmission of the necessary amount of ultrasonic energy allows for an adequate amount of heat to be produced in the sealing area thereby preventing an incomplete seal from occurring which would create a defective package.

The widths of the second block 28 and the abutting portion 56 are determined from the dimensions of the sealing area P1 for each type of package, and also takes into consideration the variation of width and the accuracy of positioning the packaging material 73 within the sealing apparatus 31. Thus, even if the dimensions of the area P1 and the setting position of the packaging material 73 change depending on the type of packaging containers to be formed, the shape of the top surface of the abutting portion 56 may adjust each time to correspond to the exterior shape of the packaging material thereby preventing incomplete sealing from occurring in the packaging containers.

As shown in FIG. 7, an electromagnet(s) 75 is/are disposed in the first block 27, the third block 29, or both blocks 27 and 29. The electromagnet is placed below the holes 57 and 58, and adapted to be selectively energized and magnetized by means of a control system, not shown. If the plurality of slidable plates 71 are composed of a ferromagnetic material, the actuation of the electromagnet 75 selectively attracts each of the plurality of slidable plates 71. However, the plurality of plate members may also be composed of a paramagnetic material in which magnetism is induced instead of being an inherent property such as for a ferromagnetic material. The plurality of slidable plates 71 may also be composed of a material with a high hardness such as a ceramic material. In such an embodiment, due to the lack of magnetism in the ceramic material, the first block 27 and the third block 29 are composed of a ferromagnetic material and thus selectively attracted by the actuation of the electromagnet 75 which results in the plurality of slidable plates 71 being held in place by the first block 27 and the third block 29. The first block 27 and the third block 29 may also be composed of a ferromagnetic material when the plurality of slidable plates 71 are composed of a ferromagnetic material thereby utilizing the attractive forces produced in the first block 27 and the third block 29 when the electromagnet is actuated by the control system. The hardness of each of the plurality of slidable plates 71 must be sufficiently high in order to prevent the attenuation of the ultrasonic energy transmitted to the packaging material. To secure a "squeezing margin", the total thickness of the plurality of slidable plates 71 should be slightly thicker (by approximately 0.5 to 1.0 mm) than the thickness of the main body 50 of the second block 28.

INDUSTRIAL APPLICATION

In operation, the sealing apparatus 31 of the present invention may utilized to seal the sealing areas of various packaging containers such as gable top cartons, parallelepiped packages, and other similar packages. For the gable top cartons, the sealing area is typically the top fin of the carton while in a parallelepiped package the sealing area is usually the transversal seal area. Initially, the electromagnet (75) is not magnetized when the packaging material 73 is placed between the anvil 23 and the horn 35. The anvil 23 and the ultrasonic horn 35 are moved toward each other to engage the packaging material 73. Alternatively, the packaging material 73 may be placed on the anvil 23 wherein the ultrasonic horn 35 will be moved to engage the packaging material (73). Either way, the distal end of the ultrasonic horn 35 is brought into pressing contact with the packaging material 73. This pressing force against the packaging material 73 results in the slidable plates 71 corresponding to the area P1, where the sealing lines cross each other, being moved away from the material to correspond to the exterior shape of the sealing area P1 of the packaging material 73. This movement only occurs where the pressing force is greater than the repulsive force of the elastic sleeve 63. Then the electromagnet (75) is energized and magnetized thereby causing the plurality of slidable plates 71 to be attracted to each other which results in the restriction of the plurality of slidable plates 71 allowing for the top surface of the abutting portion 56 to be retained in this conformational shape corresponding to the exterior shape of the sealing area P1 of the packaging material 73.

Next, the driving section 36 is activated thereby generating ultrasonic energy (the high frequency vibrations) by the vibrator which is amplified by the booster and transmitted to the horn 35. The ultrasonic energy transmitted to the horn 35 is concentrated in the convergence section 22 and transmitted to the distal end. The ultrasonic energy is transmitted to the packaging material 73 from the distal end of the horn 35. The ultrasonic energy causes the thermoplastic resin material to be heated to a temperature in excess of this melting temperature thereby resulting in the sealing of the sealing area P1 of the packaging material 73. Once an adequate amount of ultrasonic energy is delivered to the packaging material 73, the generation of ultrasonic energy is ceased at the vibrator and the horn 35 is withdrawn from engagement with the packaging material. The anvil 23 may also be withdrawn if applicable. The newly sealed package container is removed from the ultrasonic sealing apparatus 31 allowing the sealed area P1 to cool in order to solidify the seal. The electromagnet 75 is deactivated allowing for the plurality of slidable plates 71 to return to their pre-magnetism state in preparation for the next packaging container to be sealed at the sealing apparatus 31. The elastic force provided by the elastic sleeve 63 in the hole 59 allows for the plurality of slidable plates 71, that conformed to the exterior shape of the sealing area P1 of the packaging material 73, to return to an equilibrium with the entirety of the plurality of slidable plates 71 and the other abutting portions 51 and 53, thereby providing for an even sealing surface of the anvil 23.

What is claimed is:

1. An apparatus for sealing a portion of a packaging container, the portion having a predetermined exterior shape, the apparatus comprising:

a generator for generating ultrasonic energy;

a horn in contact with the generator, the horn having a distal end vibrated by the ultrasonic energy generated by the generator; and an anvil having an abutting portion formed from a plurality of slidable plates that conforms to the exterior shape of the portion of the packaging container, the abutting portion opposing the distal end of the horn.

2. The apparatus according to claim 1 further including an electromagnet disposed to selectively restrict the sliding of each of the plurality of slidable plates.

3. The apparatus according to claim 1 wherein each of the plurality of slidable plates is formed from a ferromagnetic material.

4. The apparatus according to claim 1 wherein each of the plurality of slidable plates is formed from a paramagnetic material.

5. The apparatus according to claim 1 wherein each of the plurality of slidable plates is formed from a ceramic material.

6. The apparatus according to claim 1 wherein each of the plurality of slidable plates is formed from a material having a small coefficient of friction.

7. The apparatus according to claim 30 wherein the anvil comprises a first block, a second block and a third block, the abutting portion disposed on the second block.

8. A method for sealing a sealing portion of a packaging container, the sealing portion having a predetermined exterior shape, the method comprising the steps of:

positioning the sealing portion of the packaging container between an ultrasonic horn and an anvil, the anvil having an abutting portion that conforms to the exterior shape of the sealing portion of the packaging container, the abutting portion including a plurality of slidable plates;

engaging the abutting portion of the anvil with the sealing portion of the packaging container;

conforming the abutting portion of the anvil to the predetermined exterior shape of the sealing portion of the packaging container; and transferring ultrasonic energy from the ultrasonic horn to the sealing portion of the packaging container.

9. The method according to claim 8 including the step of energizing an electromagnet disposed within the anvil prior to transferring ultrasonic energy to the sealing portion, wherein the magnetism of the electromagnet restricting the sliding of each of the plurality of slidable plates.

10. The method according to claim 8 wherein each of the plurality of slidable plates is formed from a ferromagnetic material.

11. The method according to claim 8 wherein each of the plurality of slidable plates is formed from a paramagnetic material.

12. The method according to claim 8 wherein each of the plurality of slidable plates is formed from a ceramic material.

13. The method according to claim 8 wherein each of the plurality of slidable plates is formed from a material having a small coefficient of friction.

14. The method according to claim 8 wherein the anvil comprises a first block, a second block and a third block, and wherein the abutting portion is disposed on the second block.

15. An anvil for use with an ultrasonic horn to seal an end of a packaging container, the end of the packaging container having a predetermined exterior shape, the anvil comprising:

a first block having a first surface;

a second block having a second surface and third surface, the second surface disposed adjacent to the first surface of the first block, the second block having an abutting portion that conforms to the exterior shape of the end of the packaging container, the abutting portion including a plurality of slidable plates;

a third block having a fourth surface, the fourth surface disposed adjacent to the third surface of the second block; and an electromagnet disposed on one of the first and third blocks.

16. The anvil according to claim 15 wherein each of the plurality of slidable plates is formed from a ferromagnetic material.

17. The anvil according to claim 15 wherein each of the plurality of slidable plates is formed from a material having a small coefficient of friction.

18. An improved apparatus for sealing a portion of a packaging container, the portion having a predetermined exterior shape, the apparatus including a generator, a horn and an anvil, the generator generating ultrasonic energy to transmit to the horn, the horn having a distal end vibrated by the ultrasonic energy generated by the generator, the improvement comprising: an abutting portion on the anvil that includes a plurality of slibale plates and that deforms to correspond to the exterior shape of the portion of the packaging container, the abutting portion being opposite the distal end of the horn.

19. The apparatus according to claims 18 further including an electromagnet disposed to selectively restrict the sliding of each of the plurality of slidable plates.

20. The apparatus according to claim 18 wherein each of the plurality of slidable plates is formed from one of a ferromagnetic material, a paramagnetic material, a ceramic material and a combination thereof.

21. The apparatus according to claim 18 wherein each of the plurality of slidable plates is formed from a material having a small coefficient of friction.

22. The apparatus according to claim 18 wherein the anvil includes a first block, a second block and a third block, and wherein the abutting portion is disposed on the second block.

23. The apparatus according to claim 22 wherein the first block and the third block are formed from a ferromagnetic material.

24. A method for sealing a packaging container having a predetermined exterior shape of a sealing area using the apparatus according to claim 18 including conforming the abutting portion to the predetermined exterior shape of the sealing area prior to the transmission of ultrasonic energy to the packaging container.

25. The method according to claim 24 including the step of energizing the electromagnet subsequent to the plurality of slidable plates conforming to the exterior shape of the sealing area of the packaging container.

* * * * *